United States Patent
Awasthi et al.

(10) Patent No.: US 7,395,057 B2
(45) Date of Patent: Jul. 1, 2008

(54) SYSTEM AND METHOD FOR RECONNECTING DROPPED CELLULAR PHONE CALLS

(75) Inventors: Nikhil Awasthi, Edison, NJ (US); Richard Jenner, Dorking (GB); Mark Jones, Farnham (GB)

(73) Assignee: Avaya Technology Corp., Basking Ridge, NJ (US)

( * ) Notice: Subject to any disclaimer, the term of this patent is extended or adjusted under 35 U.S.C. 154(b) by 416 days.

(21) Appl. No.: 10/674,637

(22) Filed: Sep. 30, 2003

(65) Prior Publication Data

US 2005/0070286 A1 Mar. 31, 2005

(51) Int. Cl.
*H04Q 7/20* (2006.01)
(52) U.S. Cl. .......... 455/423; 455/417
(58) Field of Classification Search .......... 455/445, 455/414.1, 412.1, 564, 427.1, 425, 426.1, 455/515, 73, 850.1, 551
See application file for complete search history.

(56) References Cited

U.S. PATENT DOCUMENTS

| | | | |
|---|---|---|---|
| 5,995,830 A * | 11/1999 | Amin et al. | 455/423 |
| 6,275,713 B1 | 8/2001 | Toda | |
| 6,430,284 B1 * | 8/2002 | Jones | 379/229 |
| 6,603,849 B2 * | 8/2003 | Lin et al. | 379/221.01 |
| 2002/0090947 A1 * | 7/2002 | Brooks et al. | 455/436 |
| 2002/0187788 A1 * | 12/2002 | McKay | 455/450 |
| 2004/0005874 A1 * | 1/2004 | Malackowski et al. | 455/410 |
| 2004/0235509 A1 * | 11/2004 | Burritt et al. | 455/519 |
| 2005/0002405 A1 * | 1/2005 | Gao | 370/401 |
| 2005/0009521 A1 * | 1/2005 | Preece | 455/435.1 |
| 2005/0048981 A1 * | 3/2005 | Anupam et al. | 455/445 |

* cited by examiner

*Primary Examiner*—Erika A. Gary
(74) *Attorney, Agent, or Firm*—Muncy, Geissler, Olds & Lowe, PLLC

(57) ABSTRACT

The present invention relates to a system and method of reliably determining that a cellular phone call has been dropped and then automatically reconnect the call. The invention is applicable for use in telephone systems that have off-premises call hunting algorithms and thereby use separate telephony channels for the inbound and outbound legs of a call.

10 Claims, 2 Drawing Sheets

SYSTEM AND METHOD FOR RECONNECTING DROPPED CELLULAR PHONE CALLS

FIELD OF THE INVENTION

The present invention relates to a system and method of automatically reconnecting a cellular phone call. The invention is applicable for use in telephone systems that have off-premises call hunting algorithms and thereby use separate telephony channels for the inbound and outbound legs of a call.

BACKGROUND OF THE INVENTION

A not too uncommon problem with cellular phone service is that calls are dropped during a conversation between the calling and called parties. Prior art systems exist, such as Avaya's Digital HotDesk system, (described in the attached Appendix and incorporated herein by reference), that will attempt to reconnect dropped calls for calls that are being controlled by the subscriber's telephony server where this server provides a find-me/follow me feature. With such find me/follow me systems, a call placed to a subscriber's normal phone number is routed to an auxiliary number. That is, by way of example, a call placed to called subscriber's office phone is rerouted to his cell-phone. With the prior art reconnect system, the outbound call (between the server and the called party's cell phone) is monitored in an attempt to identify the occurrence of a cellular cut-off, that is, the loss of the call connection due to network coverage limitations. Typically, this is done by waiting a specified period of time, after the called party has cleared down, while the calling party is still holding onto the call. If the time period is exceeded, the system will automatically place a call back to the called party, and provide a voice message to the calling party (e.g., "Please remain on the line while we attempt to reconnect your call"). If the called party's cellular phone is available and he answers the call, then the calling party and called party are reconnected. Typically such a system will try to reconnect to the called party for a given time period, and if unsuccessful during this period it will then place the calling party into the called party mailbox.

Such a reconnect system, when working properly, has various advantages to both the called and calling parties. From the calling party's prospective, they do not have to redial in the event of a call being lost due to limitations in cellular coverage—they will either be reconnected to the called party or they will be offered a chance to leave a message. The called party knows that the call will be reestablished and waits for this to happen. If it is not, he can later check for a message. If used correctly, such a system eliminates the possible reaction of both parties trying to place a call to each other simultaneously and unavoidably missing each other due to call collision or limited call appearances on their telephony devices.

These prior art reconnect systems suffer from a serious deficiency in that the identification of a cellular cut-off is not always done properly. Such false alarms cause reconnection for calls intended to be terminated. Moreover, such systems encounter problems when a mobile subscriber is involved with a conference call.

The present invention overcomes these problems in the prior art by being able to more accurately determine whether or not a cellular cut-off has occurred. It also permits the reconnect feature to be implemented even when the called party joins a conference call.

SUMMARY OF THE INVENTION

The present invention automatically reconnects a phone call to a cellular subscriber by accurately determining when a cellular cut-off has occurred. One embodiment of the invention, for use in speech enabled systems, uses speech recognition algorithms to make this determination. Further embodiments of the invention permit taking the calling party's feedback before attempting to reconnect the call. Still further embodiments of the invention permit the reconnect feature to be enabled/disabled in real time.

BRIEF DESCRIPTION OF THE DRAWINGS

Various embodiments of the present invention will now be described in detail in conjunction with the annexed drawings, in which.

DETAILED DESCRIPTION

The present invention is applicable to telephone systems which have call rerouting algorithms for contacting the called party at alternative phone numbers stored in the system. These algorithms utilize separate telephony channels for the inbound and outbound legs of the call. An example of such a system is a system marketed by Avaya as the "Unified Communications Center R1.1" and which is described at Avaya's product information web site, http://www.avaya.com/ac/common/index.jhtml?location=M1H1005G1012F2055P3131N4905.

Figure 1:
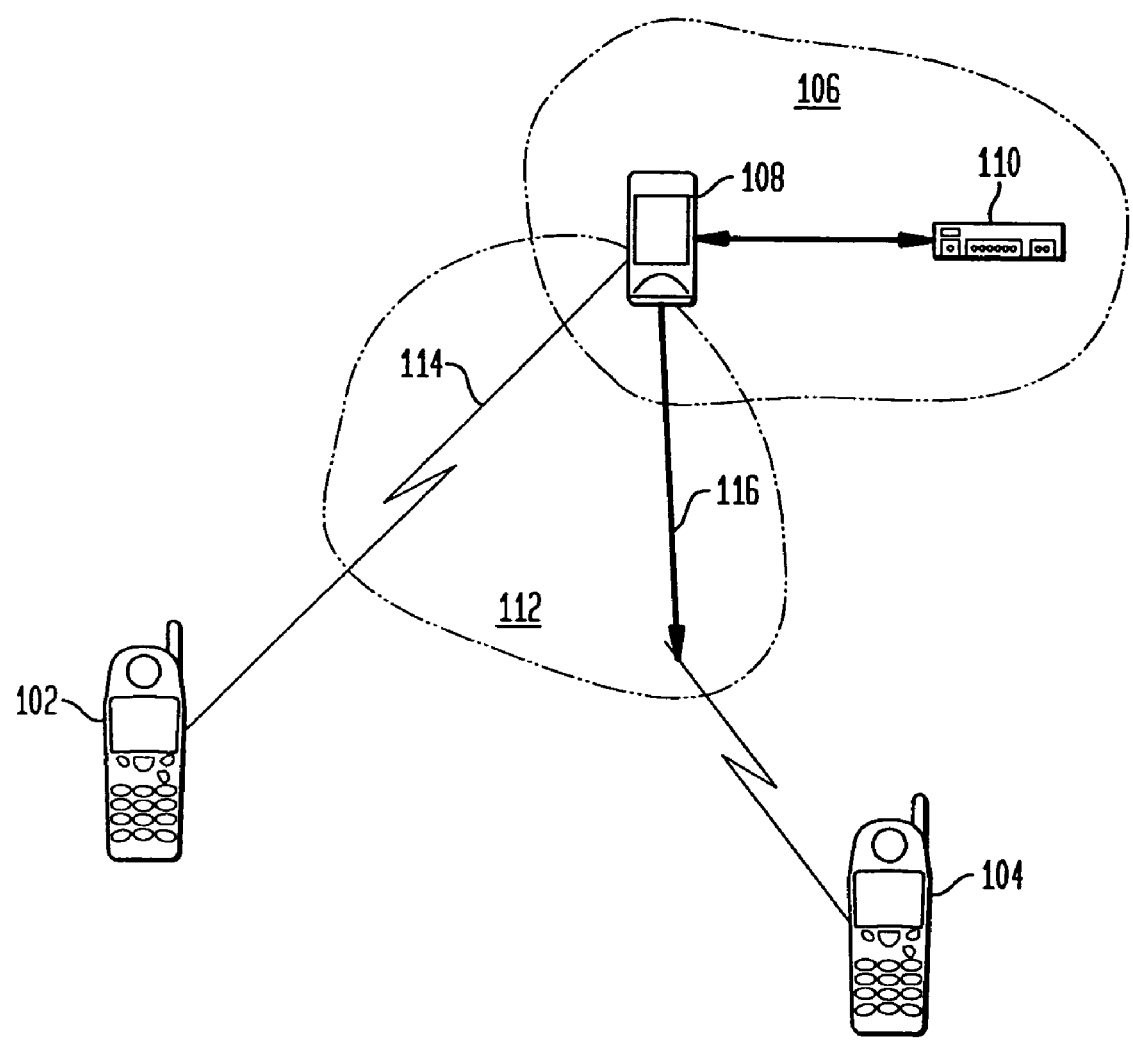
FIG. 1 is a schematic representation of a call being transferred to a called party's cell phone; and, FIG. 2 is functional diagram describing the process by which one embodiment of the invention recognizes a reconnect is appropriate and reconnects the dropped phone call.

FIG. 1 illustrates such a system in which a calling party places a call on his phone 102 to a called party's cell phone 104 through the called party's enterprise network 106 comprising a PBX 108 and a telephony server 110. While being depicted as separate entities, it is contemplated by the invention that the functions of the PBX 108 and the telephony server 110 can be combined in one physical unit. Although not shown in FIG. 1, the calling party may have originated the phone call using a land-line phone. Consequently, it is contemplated by the invention that the telephony network 112 over which the call is completed comprises both PSTN (public switched telephone network) and cellular communications.

Of significance to the invention is that the telephony server 110 is equipped with the feature whereby a call originally directed to a subscriber's number is rerouted to an alternative location number. These systems are well known in the art and permit the user to store alternative numbers where he is most often contacted (i.e., their desk, home, mobile phone, etc.). These numbers can be readily changed and/or prioritized by various interfaces with the user. Once a call is rerouted to the called party cell phone 104, the server 110 has access to both inbound 114 and outbound 116 legs of the call.

In the prior art call reconnect systems, an attempt is made to identify the occurrence of a cellular cutoff. This identification occurs by simply measuring the time duration from when the called party has cleared down while the caller is still holding on. If the time period is exceeded, the system will automatically place a call back to the called party while a voice message is communicated to the calling party advising him that a reconnect is being attempted.

The present invention improves upon the prior art systems in which the server 110, attempts to identify when a call cellular cut-off has occurred. The present invention can be readily implemented using the hardware of a conventional prior art server which implements the find me/follow me feature discussed above. The novel features of the invention are realized by application of additional algorithms which are incorporated into the server's functions.

Figure 2:
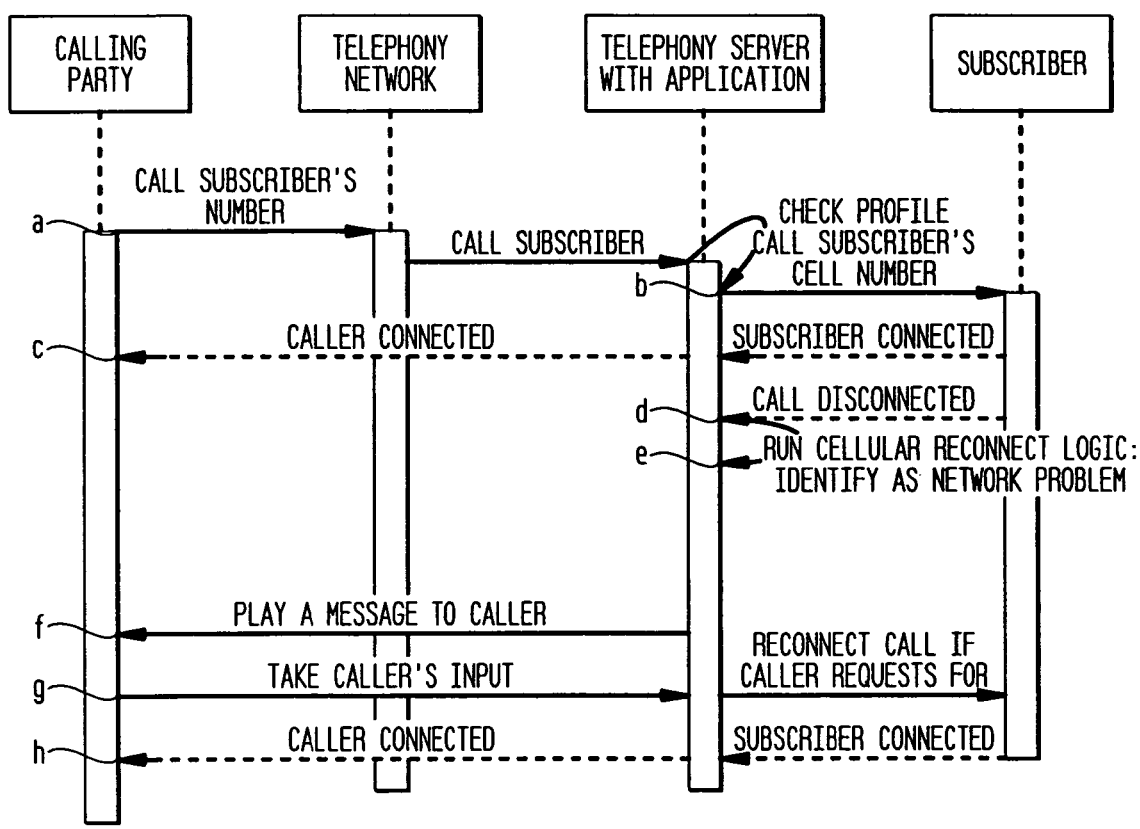

FIG. 2 functionally illustrates an exemplary call that is reconnected by the present invention. First, the calling party calls the subscriber (a), perhaps at his desk phone number. The telephone server reroutes that call (b) in accordance with alternative numbers stored in the subscriber's profile and a connection with the subscriber's cell phone occurs (c). At some time thereafter, communication with the called party is lost (d). In the embodiment of the invention depicted in step (e), an attempt is made to identify the dropped connection as a network problem. In additional embodiments of the invention depicted as step (f), a message is then communicated to the calling party asking if he wants to reconnect the call. If he responds in the affirmative (g), the call is re-established (h).

The present invention permits the called subscriber to enable and disable the dropped call reconnect feature (e.g., via DTMF key pad or speech commands). This feature is particularly useful should the called party wish to drop from a conference call.

As noted in step (f) of FIG. 2, one embodiment of the present invention requests input from the calling party, rather than merely sending a message that the call attempted to be reconnected. By way of example, this message may say "Your phone connection appears to have been unintentionally dropped. Please press or say '1' if you wish to have this connection automatically reestablished". The invention then waits a fixed period of time to receive this authorization to reconnect the call. This waiting period would be a system parameter that is assigned a default value but which is readily changeable. Only if the authorization is received would a reconnecting be attempted.

An alternative embodiment of the invention is applicable to speech enabled systems. An example of such a system is marketed by Avaya and is described in their product information web site, http://support.avaya.com/japple/css/
japple?PAGE=avaya.css.CSSLvl1&temp.groupID=139233.

These systems would detect specific words like "bye" or "good-bye" which precede the called party connection being dropped. As the invention is a service provided to a subscriber, additional embodiments of the invention contemplate that his typical personal phone conversation closing remarks be entered as models into his data base profile. The user's voice could be used to create these model entries thereby improving the speech recognition accuracy of the system. In one embodiment of the invention, the detection of these closing words would be deemed by the system as confirmation of the call being completed (and intentionally terminated) and accordingly, the system would not attempt a reconnect. Thus, returning to FIG. 2, this embodiment of the invention would terminate the process at step (e) and not request input from the calling party As noted above, under the proper conditions the invention will attempt a reconnect of the phone call with the calling party. Of course, the network problem which caused the dropped connection, may not have been remedied (e.g., the called party is stuck in traffic in a tunnel). In additional embodiments of the invention, the system has settable parameters as to the number of times it attempts to reconnect and a time interval between such attempts. Should all these attempts prove unsuccessful, the calling party is given the option of leaving a message in the called party's voice mail by various means that are well known in the prior art.

It should be noted that most of the options discussed above (e.g., settable parameters, disabling of reconnect feature) are available to the called subscriber. Additional embodiments of the invention give the calling party an option as well. In the situation where one or more reconnect attempts are made, the calling party can terminate the attempt at reconnecting. Thus for example, he need not wait for 10 reconnect attempts to occur which are spaced 30 seconds apart. Absent any special system feature, he could of course, simply hang up to avoid this wait. However, doing so will not permit him to leave a voice mail message. These additional embodiments of the invention permit the calling party to enter or say a code that would be recognized by the system, immediately terminate the reconnect attempt(s) and give him access to the called party's voice mail.

It will be understood that the forgoing description of the invention is by way of example only, and variations will be evident to those skilled in the art without departing from the scope of the invention, which is as set out in the appended claims.

What is claimed is:

1. A method for reconnecting a dropped telephone connection between a calling party and a called party, said telephone connection having been established by a telephone call having been initially placed by the calling party to a primary number of the called party through a telephony server, thereby establishing an inbound call from the calling party to the server and an outbound call from the server to the called party, said method comprising:

monitoring by the server the status of the inbound call;
monitoring by the server the status of the outbound call;
detecting by the server a situation where the status of the inbound call is active and the status of the outbound call is dropped;
monitoring words used by the called party, the calling party, or both during the telephone connection to detect if one or more standard closing remarks are used in time proximity to the outbound call being dropped; and
attempting by the server to reestablish the telephone connection with the called party only if said one or more standard closing remarks are not detected in time proximity to the outbound call being dropped.

2. The method of claim 1 wherein said step of monitoring of words used by the called party, the calling party, or both comprises the step of monitoring words used by the called party without monitoring words used by the calling party.

3. The method of claim 1 comprising the additional step of requesting confirmation from the calling party before reconnecting the outbound call.

4. A system for reconnecting a dropped telephone connection between a calling party and a called party, said telephone connection having been established by a telephone call having been initially placed by the calling party to a primary number of the called party through a telephony server, thereby establishing an inbound call from the calling party to the server and an outbound call from the server to the called party, said system comprising:

a first monitoring means contained in said server for monitoring the status of the inbound call;
a second monitoring means contained in said server for monitoring the status of the outbound call;

a detecting means contained in said server for detecting a situation where the status of the inbound call is active and the status of the outbound call is dropped;

a third monitoring means for monitoring of words used by the called party, the calling party, or both during the telephone connection to detect if one or more standard closing remarks are used in time proximity to the outbound call being dropped; and a means contained in said server for attempting to reestablish the telephone connection with the called party only if said one or more standard closing remarks are not detected in time proximity to the outbound call being dropped.

5. The method of claim 4 wherein said third monitoring means does not monitor words used by the calling party.

6. The method of claim 4 including confirmation means for confirming with the calling party that the outbound call should be reconnected before attempting to reconnect the outbound call.

7. A method for reconnecting a dropped telephone connection between a calling party and a called party, comprising:

monitoring the status of the call;

monitoring words used by the called party, the calling party, or both during the telephone connection to detect if one or more standard closing remarks are used;

detecting that the call has been dropped; and attempting to automatically reestablish the telephone connection only if said one or more standard closing remarks are not detected within a given time of the call being dropped.

8. The method of claim 7 including the additional step of confirming with the calling party or the called party that the connection should be reestablished before attempting to automatically reestablish the telephone connection.

9. A system for reconnecting a dropped telephone connection between a calling party and a called party, comprising:

a first monitoring means for monitoring the status of the call;

a detecting means for detecting that the call has been dropped;

a second monitoring means for monitoring words used by the called party, the calling party, or both during the telephone connection to detect if one or more standard closing remarks are used; and a reconnect means for attempting to automatically reestablish the telephone connection with the called party only if said one or more standard closing remarks are not detected within a given time period of the call being dropped.

10. The system of claim 9 wherein said reconnect means obtains authorization from the calling party or the called party before attempting to automatically reestablish the telephone connection.

* * * * *